United States Patent
Geusendam

(10) Patent No.: US 9,859,664 B2
(45) Date of Patent: Jan. 2, 2018

(54) MEDIUM VOLTAGE CONNECTION

(71) Applicant: EATON INDUSTRIES (NETHERLANDS) B.V., SC Hengelo (NL)

(72) Inventor: Paulus Geusendam, Hengelo (NL)

(73) Assignee: EATON INDUSTRIES (NETHERLANDS) B.V., Hengelo (NL)

( * ) Notice: Subject to any disclaimer, the term of this patent is extended or adjusted under 35 U.S.C. 154(b) by 8 days.

(21) Appl. No.: 14/438,935

(22) PCT Filed: Oct. 28, 2013

(86) PCT No.: PCT/EP2013/072517
§ 371 (c)(1),
(2) Date: Apr. 28, 2015

(87) PCT Pub. No.: WO2014/067902
PCT Pub. Date: May 8, 2014

(65) Prior Publication Data
US 2015/0288109 A1    Oct. 8, 2015

(30) Foreign Application Priority Data

Oct. 30, 2012 (GB) .................................. 1219525.1
Nov. 7, 2012 (GB) .................................. 1220071.3

(51) Int. Cl.
| H01R 13/6598 | (2011.01) |
| H01R 13/53 | (2006.01) |
| H01R 13/6584 | (2011.01) |
| H02G 15/18 | (2006.01) |

(52) U.S. Cl.
CPC ......... *H01R 13/6598* (2013.01); *H01R 13/53* (2013.01); *H01R 13/6584* (2013.01); *H02G 15/18* (2013.01)

(58) Field of Classification Search
None
See application file for complete search history.

(56) References Cited

U.S. PATENT DOCUMENTS

| 4,006,288 A | 2/1977 | Stevens |
| 4,234,755 A | 11/1980 | Simons |
| 5,801,332 A | 9/1998 | Berger et al. |
| 5,885,222 A * | 3/1999 | Kassal ................... A61B 7/003 |
| | | 600/528 |

(Continued)

FOREIGN PATENT DOCUMENTS

WO    WO 9708801 A1    3/1997

*Primary Examiner* — Hoa C Nguyen
*Assistant Examiner* — Stanley Tso
(74) *Attorney, Agent, or Firm* — Leydig, Voit & Mayer, Ltd.

(57) ABSTRACT

A medium voltage connection has: a first conductor and a second conductor electrically attached to each other; a first isolating layer arranged around the first conductor and a second isolating layer arranged around the second conductor, leaving an air gap between both isolating layers; an isolating rubber sleeve arranged between the first isolating layer and the second isolating layer to fill the air gap between the two isolating layers. A conducting layer is arranged on the first isolating layer and the rubber sleeve is provided with a conducting portion, which overlaps with the conducting layer.

5 Claims, 2 Drawing Sheets

(56) References Cited

U.S. PATENT DOCUMENTS

| | | | | |
|---|---|---|---|---|
| 7,901,243 B1* | 3/2011 | Yaworski | ................ | H01R 4/34 |
| | | | | 439/523 |
| 2014/0076627 A1* | 3/2014 | Maher | .................. | H02G 15/064 |
| | | | | 174/77 R |
| 2014/0353525 A1* | 12/2014 | Torregrosa | ........ | H01J 37/32917 |
| | | | | 250/492.3 |

* cited by examiner

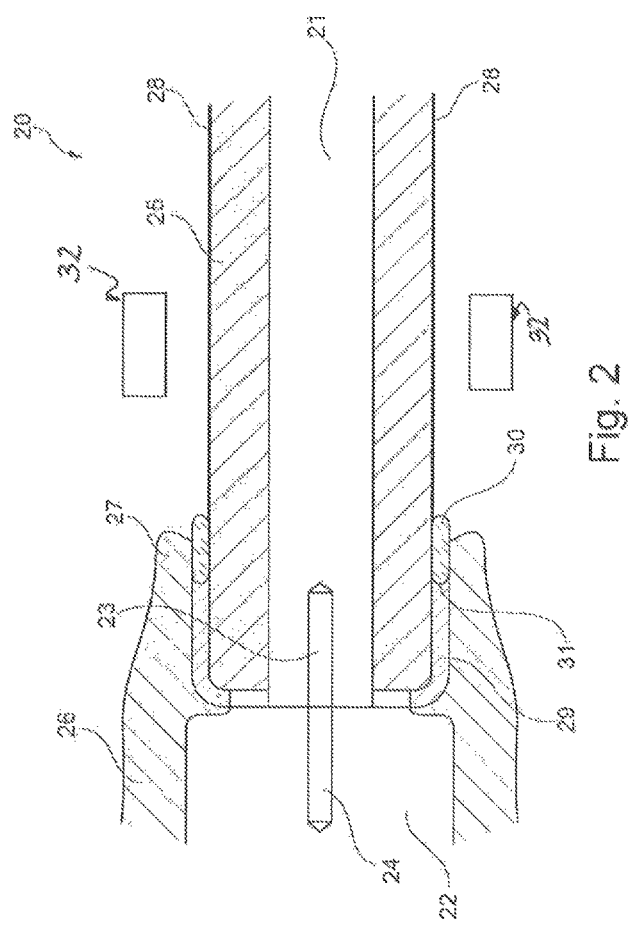

MEDIUM VOLTAGE CONNECTION

CROSS-REFERENCE TO RELATED APPLICATIONS

This application is a U.S. national stage application under 35 U.S.C. §371 of International Application No. PCT/EP2013/072517, filed on Oct. 28, 2013, and claims benefit to British Patent Application No. 1219525.1, filed on Oct. 30, 2012, and British Patent Application No. 1220071.3, filed on Nov. 7, 2012. The International Application was published in English on May 8, 2014, as WO 2014/067902 A1 under PCT Article 21(2).

FIELD

The invention relates to a medium voltage connection.

Such medium voltage connections are known and are used in switchgear to connect for example inbound or outbound cables to the switchgear. These medium voltage connections are also used to connect the busbars of adjacent panels of switchgear.

In some applications of the medium voltage connections at least the first conductor is provided with a ground screen. Such a screen is for example used at busbar connections or with current transformers, which are typically used to provide a low voltage signal for measuring the current in the first conductor. In this last application, it is necessary to have a grounding screen between the first conductor and the coil arranged around the conductor to prevent flash over to the low voltage side.

It is known to embed a grounding screen in the isolating layer around the conductor. In manufacturing, a perforated tube is positioned concentrically around the conductor, where after a resin is cast around the conductor and the screen. The perforations ensure that the resin can penetrate the screen.

It proves however that this manufacturing method results in a high number of rejected products. This is the result of misaligned screens, deformed screens and air pockets in the resin.

Another disadvantage of the known screens, is that a high field density is present around the edge of the screens. Because the screen is embedded in isolating material, the field density will extend into the air surrounding the medium voltage connection, which is undesired, especially with low voltages components near the medium voltage connection. This could lead to undesired electrical discharges.

Yet another disadvantage of the known medium voltage connection, is that when connecting for example a cable to the first conductor with embedded screen in the isolating layer, the medium voltage connection is subjected to substantial mechanical stresses. These mechanical stresses are caused by the weight of the cable and by the expanding and shrinking of the isolating material due to heating and cooling of the connection. In time, this results in cracks in the isolating layer.

SUMMARY

An aspect of the invention provides a medium voltage connection, comprising: a first conductor; a second conductor, electrically attached to the first conductor; a first isolating layer arranged around the first conductor; a second isolating layer arranged around the second conductor, leaving an air gap between the first isolating layer and the second isolating layer; and an isolating rubber sleeve arranged between the first isolating layer and the second isolating layer, so as to fill the air gap between the two isolating layers, wherein a conducting layer is arranged on the first isolating layer; wherein the rubber sleeve includes a conducting portion, wherein the conducting portion overlaps with the conducting layer, and wherein a transition between the conducting portion and an isolating portion of the rubber sleeve is positioned between the first and second isolating layers.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 shows a cross sectional view of an embodiment of a medium voltage connection according to the invention.

DETAILED DESCRIPTION

Figure 1:
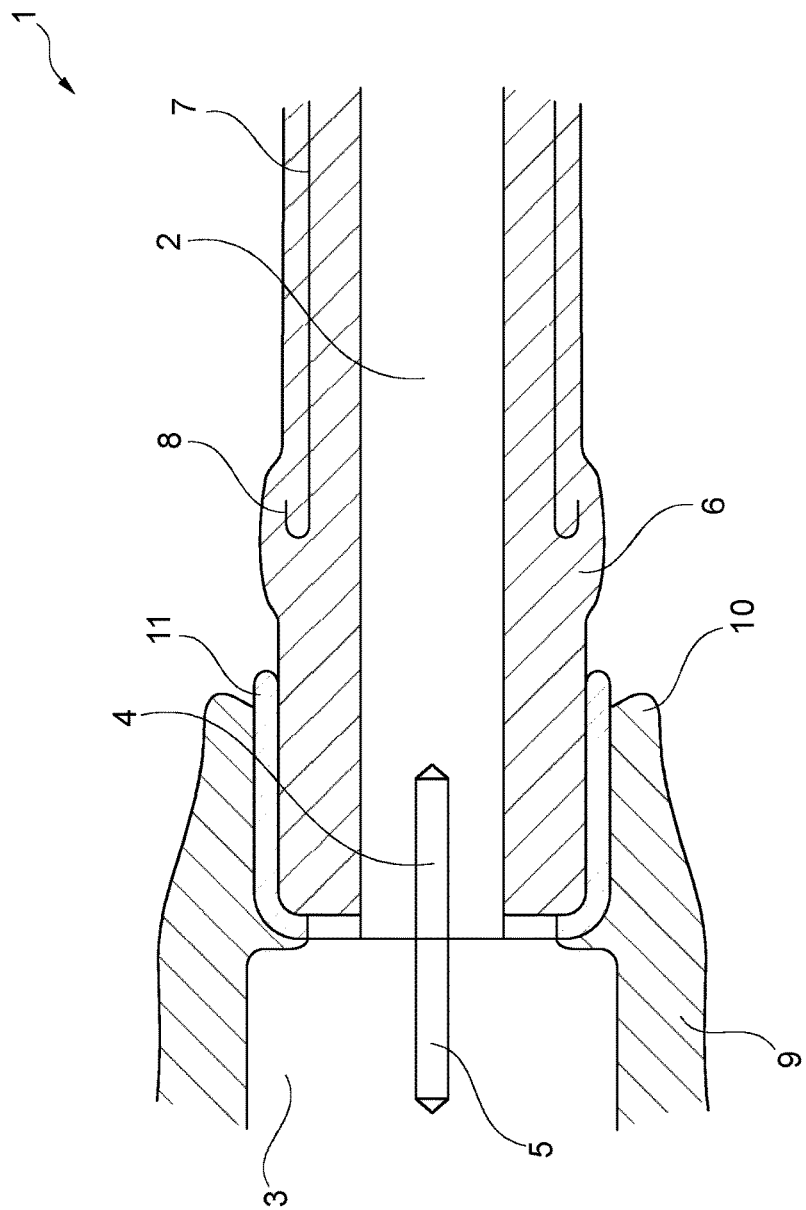
FIG. 1 shows a cross sectional view of an embodiment of a medium voltage connection according to the prior art.

An aspect of the invention provides a medium voltage connection, comprising:
- a first conductor and a second conductor electrically attached to each other;
- a first isolating layer arranged around the first conductor and a second isolating layer arranged around the second conductor, leaving an air gap between both isolating layers;
- an isolating rubber sleeve arranged between the first isolating layer and the second isolating layer to fill the air gap between the two isolating layers.

An aspect of the invention provides a medium voltage connection, which is characterized in that a conducting layer is arranged on the first isolating layer; and in that the rubber sleeve is provided with a conducting portion, which overlaps with the conducting layer.

By providing a conducting layer on the isolating layer, it is ensured that the grounding screen provided by the conducting layer is always correctly positioned. It is no longer necessary to already position the screen before casting the isolating layer, but with the invention the isolating layer can be cast first and afterwards, the conducting layer can be arranged. This substantially reduces the number of rejects during manufacturing, as positioning of the screen will always be correct.

The conducting portion of the rubber sleeve ensures that the end of the screen is extended into the air gap between the two isolating layers. The high field concentration typically present at the edge of the screen is in this way moved to a position well enveloped by isolating material.

An additional advantage of arranging the conducting layer on the isolating layer of the conductor, is that with the same outer dimensions a thicker layer of insulating material is present between the screen and the conductor. This substantially increases the dielectric robustness.

As the screen is arranged on the outside and no longer embedded in the isolation layer, as with the prior art, the mechanical stresses have less influence, resulting in a better durability.

In a preferred embodiment of the medium voltage connection according to the invention, the transition between the conducting portion and isolating portion of the rubber sleeve is positioned between the first and second isolating layers.

The rubber sleeve can be composed out of two separate materials, one isolating portion and one conducting portion. The conducting portion is brought in electrical contact with the conducting layer. In this way, the electrical screen is extended and the edge of the screen is displaced to in between the isolating layers. Any high electrical field concentrations will be kept with the isolating material.

In another embodiment of the medium voltage connection according to the invention the second isolating layer partially envelopes the rubber sleeve and the first isolating layer. This further increases the thickness of isolating material over the extended edge of the screen.

Preferably the conducting portion of the rubber sleeve is carbon black filled. Carbon black provides electric conducting properties and can be reliably processed in the manufacturing of the rubber sleeve.

In yet another preferred embodiment of the medium voltage connection according to the invention, a secondary coil is arranged around the first conductor for measuring the current in the first conductor.

The invention is typically, but not exclusively, suited for use in current transformers, in which it is mandatory that the secondary coil is shielded by a grounding screen from the medium voltage conductor.

Preferably, the conducting layer is a conducting paint layer. Such a conducting paint layer is easily applied on the surface of the isolating layer surrounding the conductor.

FIG. 1 shows an embodiment 1 of a medium voltage connection according to the prior art. This connection 1 has a first conductor 2 and a second conductor 3, which can be bolted together by the threaded holes 4, 5.

The first conductor 3 is provided with a first isolating layer 6. Within the isolating layer 6, a metal screen 7 is embedded. The edge 8 of the metal screen 7 is bent back to reduce the electrical field concentration.

The second conductor 3 is also provided with an insulating layer 9, which has extending edges 10 enveloping the end of the conductor 2.

A rubber sleeve 11 is arranged in between the first isolating layer 6 and the isolating layer 9, 10 to fill the gap.

Because the edge 8 of the screen 7 is at a distance from the rubber sleeve 11 and the extending edges 10, the electrical field surrounding this edge 8 easily extends into the air around the medium voltage connection 1.

FIG. 2 shows a cross sectional view of an embodiment 20 of the invention. The medium voltage connection 20 has a first conductor 21 and a second conductor 22, which can be bolted together via the threaded holes 23, 24.

The first conductor 21 is provided with an isolating layer 25, while the second conductor 22 is also provided with an isolating layer 26 having extending edges 27 to envelope the end of the first conductor 21. A secondary coil 32 is arranged around the first conductor for measuring the current in the first conductor.

The outer surface of the first isolating layer 25 is provided with a conducting coating 28 of for example conducting paint. This conduction coating 28 provides a grounding screen.

A rubber sleeve 29, 30 is arranged between the first isolating layer 25 and the second isolating layer 26. This rubber sleeve 29, 30 has a isolating portion 29 and a conducting portion 30.

This conducting portion 30 is in contact with the conducting coating 28, such that the edge 31 of the screen 28 is formed by the interface between the conducting portion 30 and the isolating portion 29.

As a result, the edge 31 of the screen is embedded between isolating edge 27 and the isolating layer 25.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A medium voltage connection, comprising:
   a first conductor;
   a second conductor, electrically attached to the first conductor;
   a first isolating layer arranged contactingly on and around the first conductor;
   a second isolating layer arranged contactingly on and around the second conductor, leaving an air gap between the first isolating layer and the second isolating layer; and
   an isolating rubber sleeve radially interposed between the first isolating layer and the second isolating layer, so as to fill the air gap between the two isolating layers,
   the isolating rubber sleeve including an inner surface and an outer surface,
   the inner surface in direct contact with the first isolating layer,
   and the outer surface in direct contact with the second isolating layer;
   wherein a conducting layer is arranged on the first isolating layer;
   wherein the rubber sleeve includes a conducting portion and an isolating portion which meet at an interface,
   wherein the conducting portion overlaps with and electrically contacts the conducting layer, and
   wherein the interface is radially interposed between the first and second isolating layers.

2. The connection of claim 1, wherein the second isolating layer partially envelopes the rubber sleeve and the first isolating layer.

3. The connection of claim 1, wherein the conducting portion of the rubber sleeve is carbon black filled.

4. The connection of claim 1, wherein a secondary coil is arranged around the first conductor for measuring the current in the first conductor.

5. The connection of claim 1, wherein the conducting layer is a conducting paint layer.

\* \* \* \* \*